US005697702A

United States Patent [19]

Triassi et al.

[11] Patent Number: 5,697,702

[45] Date of Patent: Dec. 16, 1997

[54] BATCH MIXER AND RESERVOIR LID FOR A MIXING TANK

[75] Inventors: Richard Paul Triassi, Walworth; David A. Doucette, Hamlin, both of N.Y.

[73] Assignee: Eastman Kodak Company, Rochester, N.Y.

[21] Appl. No.: 557,253

[22] Filed: Nov. 14, 1995

[51] Int. Cl.[6] .............................. G05D 11/02; B01F 15/02

[52] U.S. Cl. .................................... 366/152.2; 366/173.1; 366/182.1; 366/347

[58] Field of Search ................................ 366/152.2, 138, 366/151.1, 152.1, 153.1, 162.1, 167.1, 173.1, 173.2, 181.1, 189, 181.8, 182.1, 347

[56] References Cited

U.S. PATENT DOCUMENTS

| | | | |
|---|---|---|---|
| 3,753,554 | 8/1973 | Muller et al. | 366/138 X |
| 3,840,136 | 10/1974 | Lanfranconi et al. . | |
| 4,022,258 | 5/1977 | Steidly . | |
| 4,045,004 | 8/1977 | Berger | 366/173.1 X |
| 4,081,006 | 3/1978 | Crowell et al. . | |
| 4,103,358 | 7/1978 | Gacki et al. . | |
| 4,168,018 | 9/1979 | Zahaykevich | 366/138 X |
| 4,214,676 | 7/1980 | Cassia . | |
| 4,312,595 | 1/1982 | Houseman et al. . | |
| 4,699,188 | 10/1987 | Baker et al. . | |
| 4,941,131 | 7/1990 | Daly et al. . | |
| 5,151,731 | 9/1992 | Yamada et al. . | |
| 5,156,813 | 10/1992 | Calhoun . | |
| 5,184,164 | 2/1993 | Kose et al. . | |
| 5,331,364 | 7/1994 | Borden . | |

*Primary Examiner*—Charles E. Cooley
*Attorney, Agent, or Firm*—Peyton C. Watkins

[57] ABSTRACT

A batch mixer and a reservoir lid. The batch mixer has a station for concentrate containers, a diluent source, a reservoir, a mixing tank, and a pump. The station has a container receiver and a concentrate outlet communicating with the receiver. The station delivers a predetermined volume of concentrate through the concentrate outlet. The diluent source has a diluent source outlet. The diluent source is actuable to supply an aloquot of diluent, having a predetermined proportionality to the concentrate volume, through the diluent source outlet at a predetermined rate of flow. The reservoir is disposed to receive the aloquot of diluent from the diluent source outlet. The reservoir has a volume less than the volume of the aloquot. The reservoir has an overflow reservoir outlet disposed to drain diluent in excess of the volume of the reservoir. The mixing tank is disposed to receive the diluent from the overflow reservoir outlet and to receive the concentrate from the concentrate outlet. The pump has an intake disposed in the reservoir and an exhaust directed into the container receiver. The reservoir lid can provide the reservoir for the batch mixer. The reservoir lid includes a shell having a central through-passage and a downwardly directed peripheral margin for engagement of a mixing tank. A reservoir is disposed in the shell between the peripheral margin and the through-passage. The reservoir has an upwardly directed inlet, a downwardly directed weep hole, and an overflow reservoir outlet.

7 Claims, 7 Drawing Sheets

BATCH MIXER AND RESERVOIR LID FOR A MIXING TANK

FIELD OF THE INVENTION

The invention relates to mixing equipment and more particularly relates to a batch mixer and a reservoir lid for a mixing tank.

BACKGROUND OF THE INVENTION

In a variety of fields, chemical solutions and mixtures and the like are shipped as concentrates, but are later used after diluting. A problem is presented if the diluted solution or mixture is not stable on a long term basis and, at the same time, is subject to variable usage demands. The diluted solution or mixture needs to be made up quickly and easily in small batches. This presents a further shortcoming. Small batches magnify the problem of disposing of empty concentrate containers, particularly if residual concentrate is retained in the containers. The containers can be collected and the residual concentrate manually rinsed out, but this creates waste water and a further disposal problem. Another problem is presented in the dilution of concentrate if regulations require an anti-siphoning provision in equipment connected to a civic water supply or the like.

U.S. Pat. No. 4,103,358 to Gacki et al teaches a fluid mixing and dispensing system that washes the outsides of containers. U.S. Pat. No. 4,941,131 to Daly et al teaches a container flush for a fluid mixing system like that in U.S. Pat. No. 4,103,358. The flush and other water delivery components are coupled to a supply of pressurized water. U.S. Pat. No. 4,312,595 to Houseman et al teaches another fluid mixing system in which a container flush and other water delivery components are coupled to a supply of pressurized water.

U.S. Pat. No. 5,156,813 teaches a cup for use with a pipette probe in which fluid is introduced into a cup having an overflow element.

It would thus be deskable to provide a reservoir lid and a batch mixer incorporating the reservoir lid which provide for easy preparation of batches of diluted concentrate and washing of concentrate containers.

SUMMARY OF THE INVENTION

The invention is defined by the claims. The invention, in its broader aspects, provides a batch mixer and a reservoir lid. The batch mixer has a station for concentrate containers, a diluent source, a reservoir, a mixing tank, and a pump. The station has a container receiver and a concentrate outlet communicating with the receiver. The station delivers a predetermined volume of concentrate through the concentrate outlet. The diluent source has a diluent source outlet. The diluent source is actuable to supply an aloquot of diluent, having a predetermined proportionality to the concentrate volume, through the diluent source outlet at a predetermined rate of flow. The reservoir is disposed to receive the aloquot of diluent from the diluent source outlet. The reservoir has a volume less than the volume of the aloquot. The reservoir has an overflow reservoir outlet disposed to drain diluent in excess of the volume of the reservoir. The mixing tank is disposed to receive the diluent from the overflow reservoir outlet and to receive the concentrate from the concentrate outlet. The pump has an intake disposed in the reservoir and an exhaust directed into the container receiver. The reservoir lid can provide the reservoir for the batch mixer. The reservoir lid includes a shell having a central through-passage and a downwardly directed peripheral margin for engagement of a mixing tank. A reservoir is disposed in the shell between the peripheral margin and the through-passage. The reservoir has an upwardly directed inlet, a downwardly directed weep hole, and an overflow reservoir outlet.

It is an advantageous effect of at least some of the embodiments of the invention that a reservoir lid and a batch mixer incorporating the reservoir lid are provided which allow for easy preparation of batches of diluted concentrate and washing of concentrate containers.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

The term "concentrate" is used herein in a broad sense to refer to a liquid or solid material that is mixed with a second material, the diluent, prior to use. The second material is a liquid and in most uses is water. The concentrate can be dissolved or dispersed in the "diluent". The product of the mixing of concentrate and diluent is referred to herein as the "diluted mixture".

Figure 1:
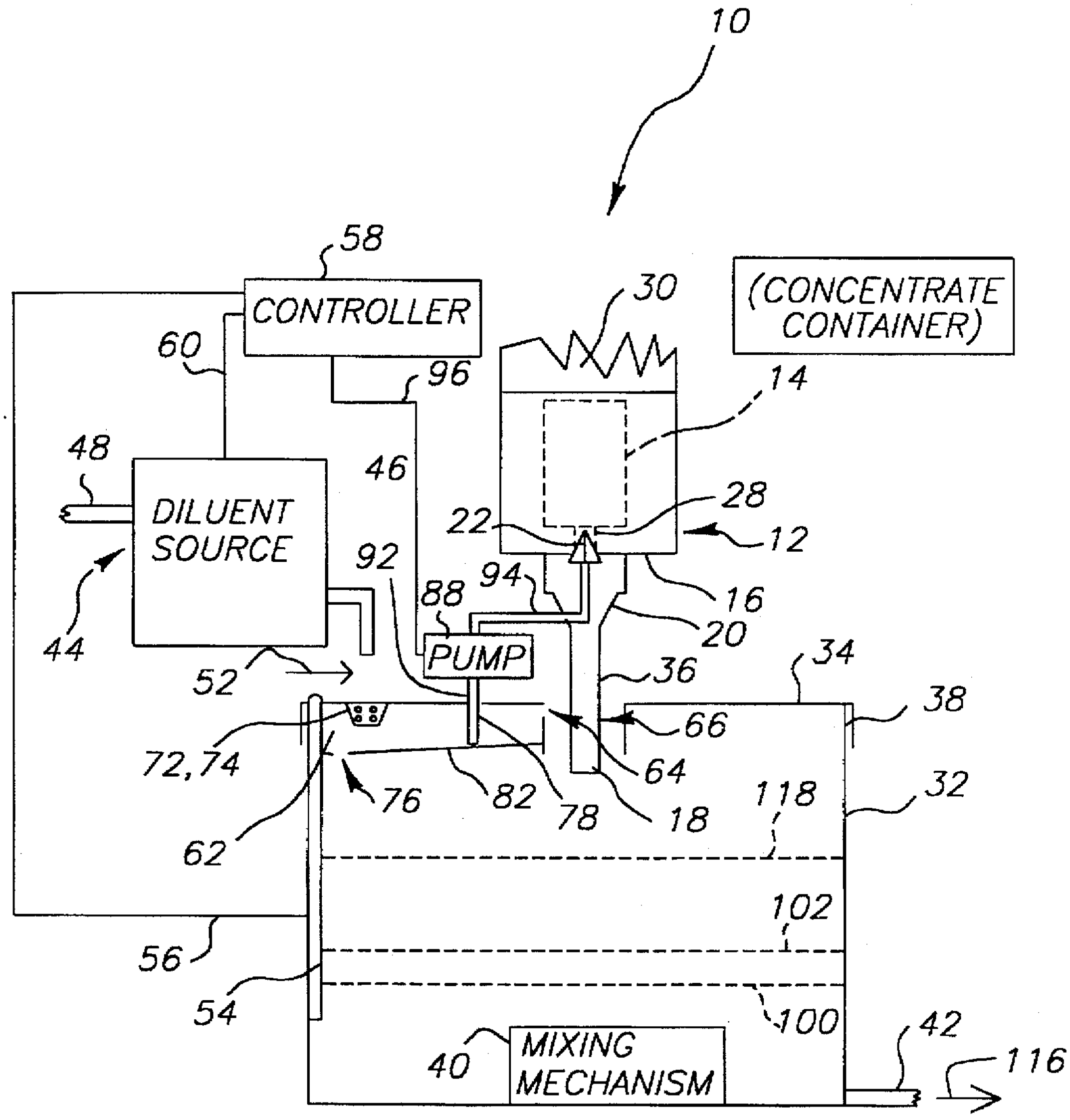
FIG. 1 is a semi-diagrammatical view of an embodiment of the batch mixer of the invention.
Figure 2:
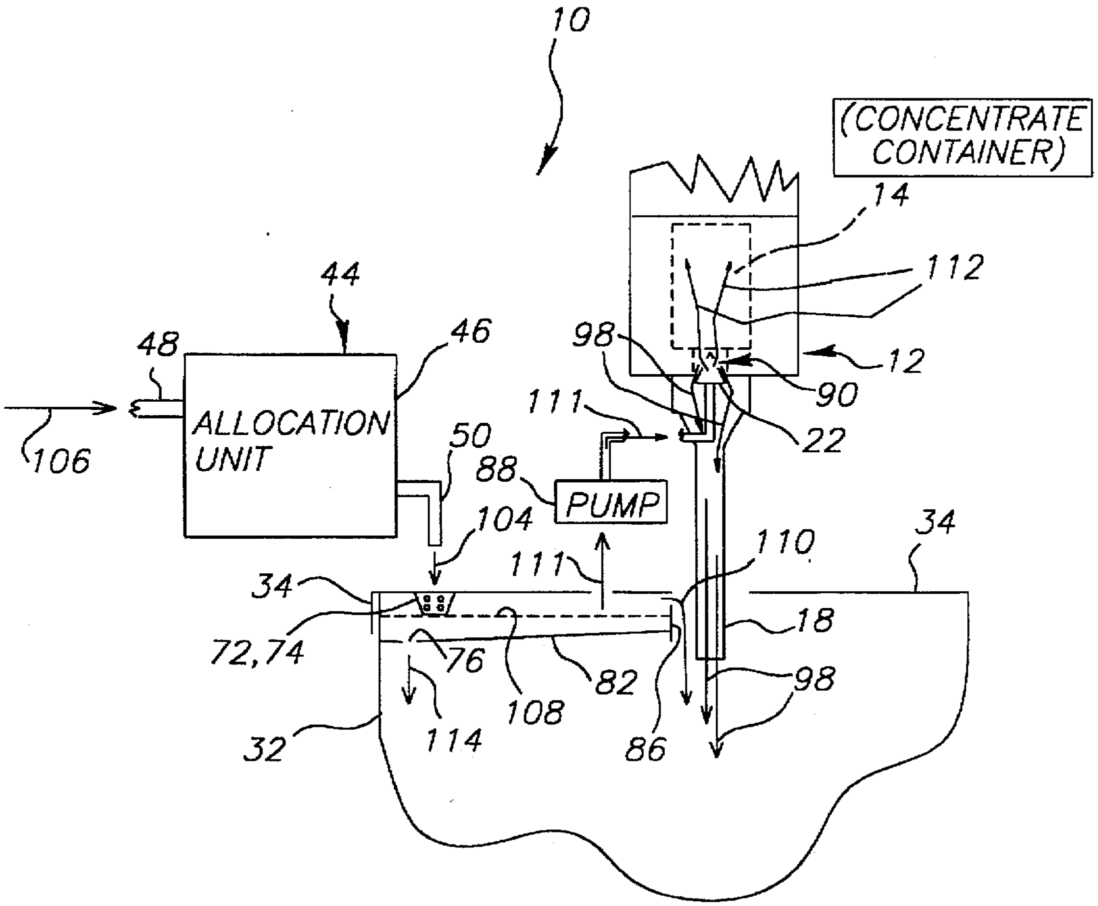
FIG. 2 is an enlarged partial semi-diagrammatical view of the batch mixer of FIG. 1, in which material flows are shown by arrows.
Figure 3:
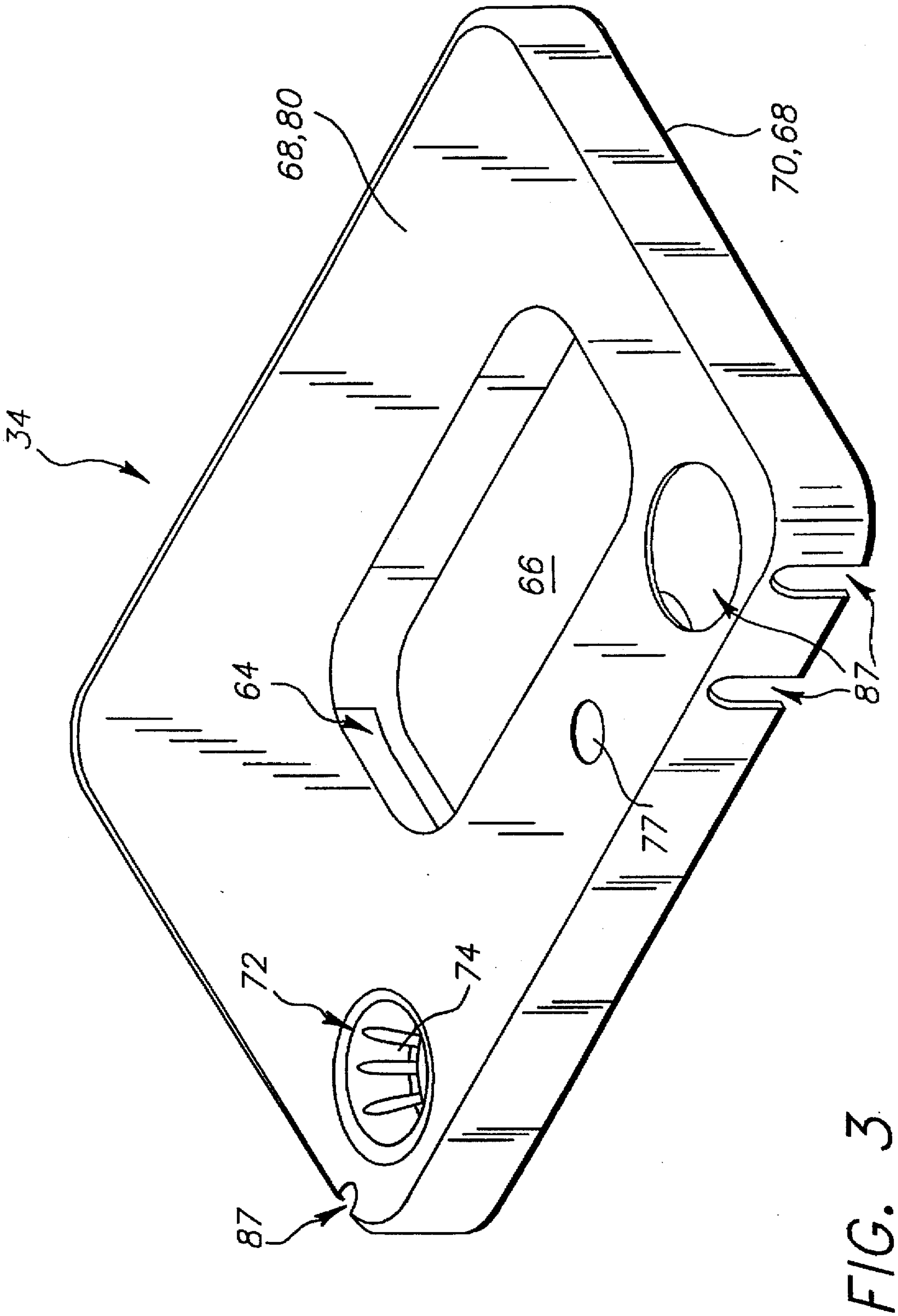
FIG. 3 is a perspective view of the reservoir lid of the batch mixer of FIG. 1.
Figure 4:
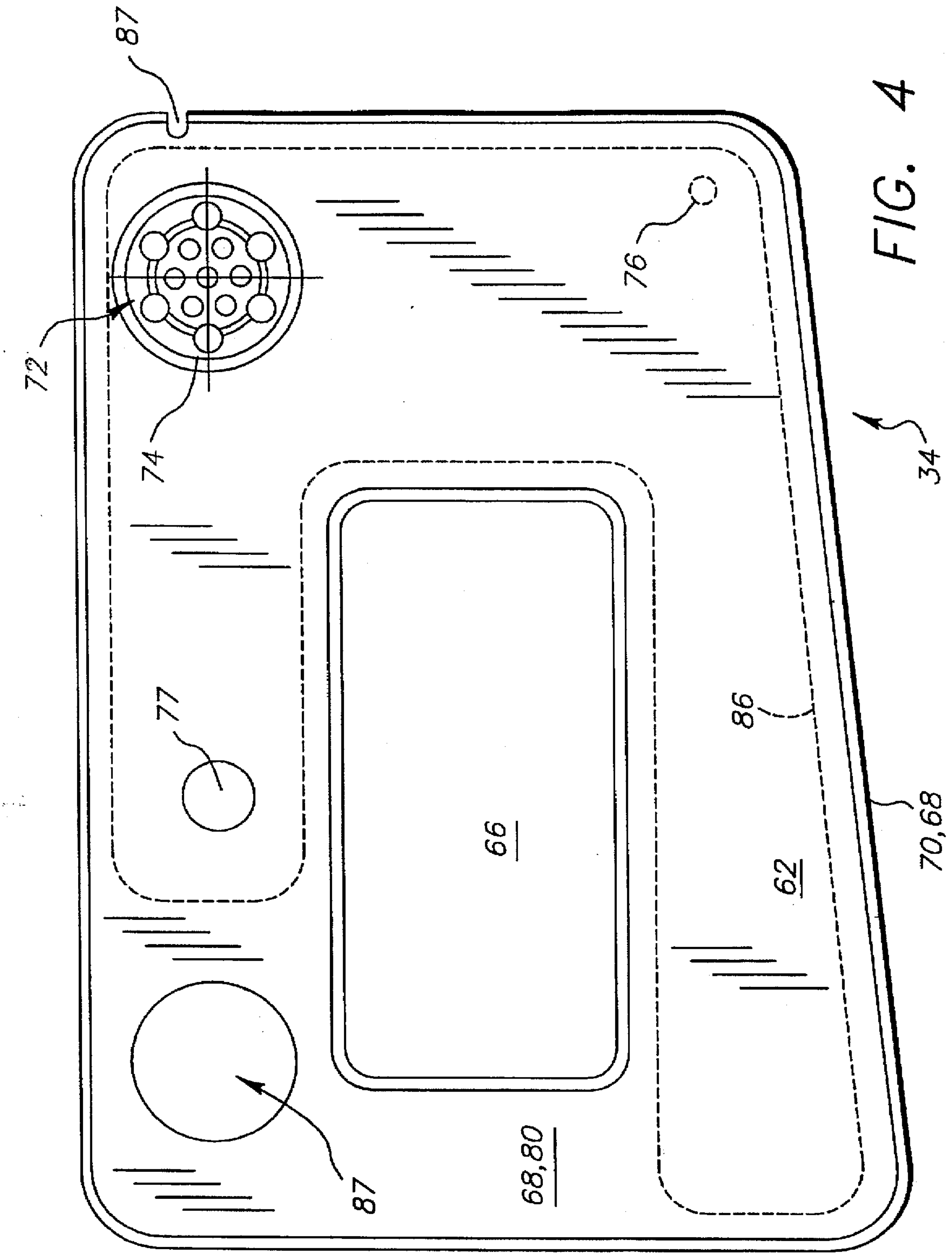
FIG. 4 is a top plan view of the reservoir lid of FIG. 3. The reservoir is indicated by dashed lines.

Referring now primarily to FIGS. 1 and 2, the batch mixer 10 of the invention has a station 12 for a concentrate container 14. The station 12 has a container receiver 16 and a concentrate outlet 18 communicating with the container receiver 16. Between the container receiver 16 and the concentrate outlet 18 is a funnel 20. The container receiver 16, funnel 20, and concentrate outlet 18 are tightly sealed together, or other measures are taken, to ensure that concentrate entering the container receiver 16 and funnel 20 must pass through to the concentrate outlet 18. The container receiver 16 supports the container 14 and holds the container 14 in position over the funnel 20.

The station 12 is actuable to deliver a volume of concentrate, i.e., the batch within the container 14, into and through the funnel 20 and then outward through the concentrate outlet 18. The station 12 can be actuated by opening a container 14, pouring the contents into the station 12, and placing the container 14 on the container receiver 16. It is highly preferred, however, that the station 12 include a container opener 22 and that actuation of the station 12 comprise a single procedure in which the container 14 is opened and drained within the station 12. This minimizes the chance of spillage, since the operator does not pour the concentrate from the container 14. The nature of the actuation of the station 12 depends upon the nature of the container 14. In order to be used with the mixer 10, the container 14 must be capable of retaining the concentrate until needed, be capable of being opened and drained within the station 12, and must be internally accessible after the concentrate has been drained. It is currently preferred that the container 14 be opened and drained by puncturing. Preferred containers 14; after puncturing, draining, and washing within the mixer 10 of the invention, and without further operator action; can be recycled as single material polymer objects. A specific example of a container 14 suitable for use with the mixer 10 of the invention is a bottle made of high density polyethylene that has a puncturable high density polyethylene cap.

The placement of the container 14 in the station 12 and the opening of the container by means of an opener 22 can occur simultaneously, that is, placing the containerized concentrate in the container station can cause the container to encounter and be pierced by a fixed opener. Alternatively, the container can first be placed in the container station and then subsequently can be opened while in the container station by a movable opener. It is preferred that the container be placed in the container station and opened and then be retained continuously within the container station.

Figure 5:
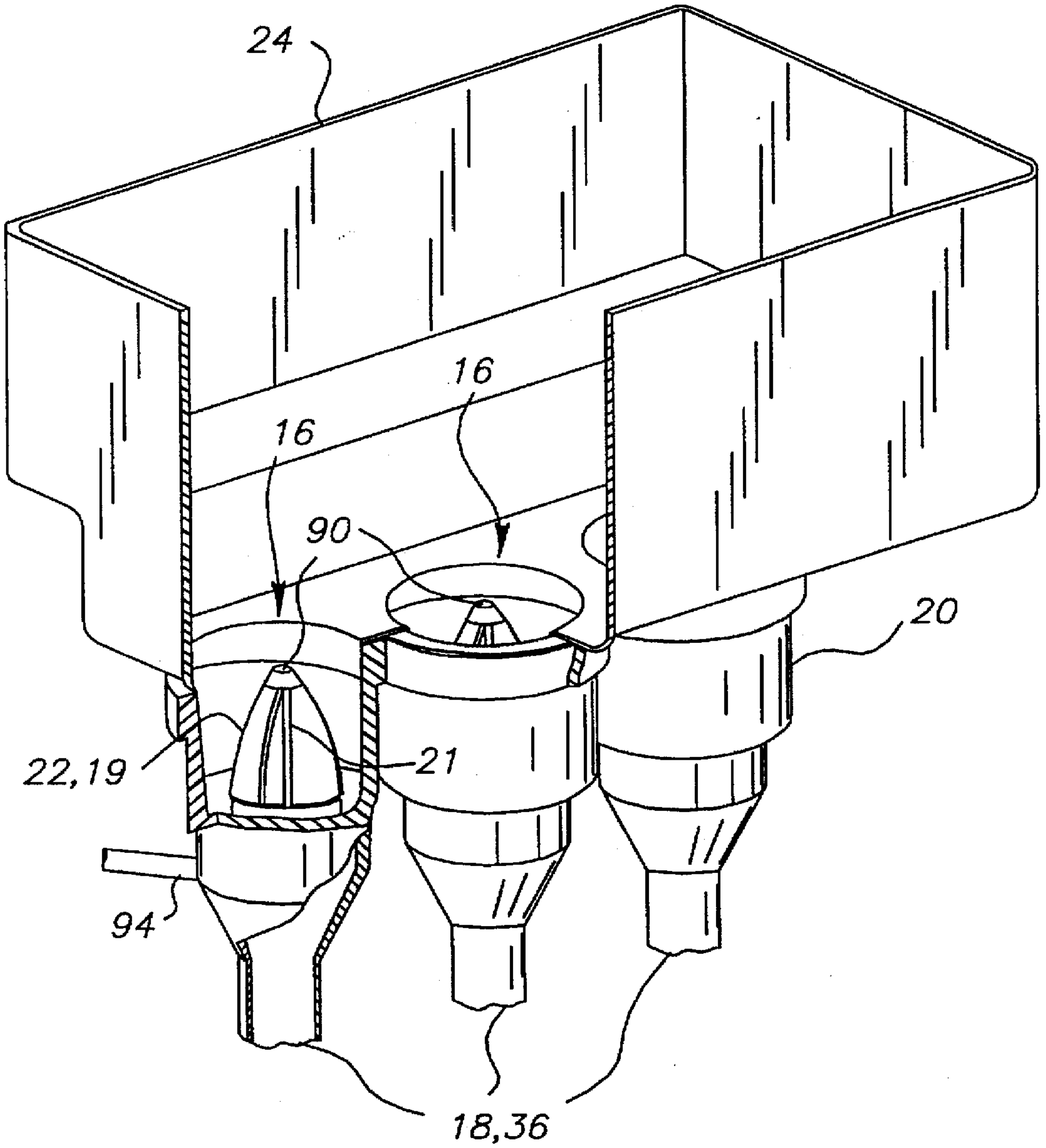
FIG. 5 is a partially cut-away perspective view of the container station of another embodiment of the batch mixer of the invention.

The container receiver 16 can be complementary in shape to a particular container 14. This is useful where multiple concentrates are used that must be stored in separate containers 14. For example, concentrates could be supplied in a container having a round cross-section and a second container having a square cross-section (not shown). The station 12 would include a pair of container receivers 16 having similar cross-sections. Container receivers 16 can be united to form a single receiver unit 24, as illustrated in FIG. 5. In this embodiment of the invention, three concentrates can be provided by rectangular cross-section containers (not shown) having three different width dimensions, or if desired, by a single multiple chambered container having three separate punctureable caps.

The container receiver or receivers 16 can be configured to help prevent concentrate spillage when the container 14 is opened. An example of a suitable shape is the trough shaped container unit 24 shown in FIG. 5. Any spilled concentrate is directed into funnels 20. Another example is a covered container receiver 16 as illustrated schematically in FIGS. 1–2.

The container opener 22 can have a variety of configurations. In the embodiment of the invention illustrated in the figures, the container 14 is a bottle having a punctureable cap 28. (For convenience, the container, cap and the like are here referred to in the singular. The same principles, as discussed here, apply to multiple bottles or a multiple-necked bottle.) The container opener 22 is rigidly mounted within the funnel 20 and has the shape of an upwardly directed broadhead arrowhead, having vanes 19 mounted to a core 21. In this embodiment, the station 12 is actuated by driving the container 14 against the opener 22 so as to puncture the cap 28. The concentrate drains by gravity. The container 14 can be slammed against the container opener 22 manually or can be driven against the opener 22 by a piston (illustrated in FIG. 1 as element 30) or the like operated by hand or powered by a solenoid or other linear drive mechanism (not shown). The container 14 can also be held in place while the opener 22 is moved to puncture the container 14. Similarly, the opener 22 can puncture the bottom or sidewall of a container rather than the cap. The container need not include a cap and can be a flexible bag rather than a rigid bottle or the like. Appropriate mechanisms for opening and draining wide varieties of containers are well known to those skilled in the art.

The funnel 20 directs concentrate to the concentrate outlet 18. In the embodiment of the invention illustrated in the figures, the funnel 20 also houses the opener 22. Located below the container receiver 16 is a mixing tank 32. Between the container receiver 16 and the mixing tank 32 is a reservoir lid 34. Concentrate travels from the container 14, through the funnel 20, and into a mixing tank 32; without collecting on the reservoir lid 34. The concentrate outlet 18 can be above the reservoir lid 34 such that concentrate cascades freely through an opening in the reservoir lid 34. It is preferred, however, that the funnel 20 have a tube portion 36 such that the concentrate outlet 18 is disposed below the upper margin 38 of the mixing tank 32. The tube portion 36 can pass through an opening in the reservoir lid 34 or bypass the reservoir lid 34 as desired. The tube portion 36 can be cylindrical in cross-section and straight or can be modified as necessary to meet space constrains.

The mixing tank 32 has a volume greater than a single batch of concentrate and any necessary diluent and can have a volume great enough to hold several batches of concentrate and diluent. The top of the mixing tank 32 is open and accepts the reservoir lid 34. The mixing tank 32 includes a mixing mechanism 40, such as a stirrer or pump, that acts to blend the components. The mixing mechanism 40 is operated as needed for a particular diluted mixture or can be continuously operated or can be operated as convenient, depending upon the requirements of a particular use. The mixing tank 32 has a tank outlet 42 from which tank contents are dispensed for use.

Diluent is supplied to the mixing tank 32 from a diluent source 44 as an aloquot proportional to the concentrate added. The diluent source 44 can have a capacity limited to the diluent necessary for a single batch of diluted mixture. It is preferred, however, that the diluent source 44 have provision for multiple batches of diluted mixture. In the embodiment of the invention illustrated in the figures, the diluent source 44 has an allocation unit 46, a connection 48 to a large diluent delivery system, and a diluent outlet 50. In preferred embodiments of the invention, the diluent is water and the diluent delivery system is a municipal water supply system or the like.

Some regulations require an anti-siphoning provision in equipment connected to public water systems. The concentrate mixer 10 meets such requirements by supplying water through a diluent outlet 50, which is separated from other components of the mixer 10 by a vertical air gap (indicated by arrow 52 in FIG. 1), through which the water falls by gravity.

Aloquots of diluent delivered by the diluent source 44 can have a uniform volume matching the standardized volume of a single batch of concentrate or can be variable, either automatically or by semi-automatically or manually, to match variable volumes of concentrate. A wide variety of controls can be utilized to provide these results; including a great many efforts in the long history of plumbing to provide aloquots of water, on demand, to various sanitary appliances. The figures illustrate an embodiment of the invention in which the volume of added concentrate is detected by a sensor 54, that sends a signal via a signal path 56 to a controller 58, that, in turn, sends a signal via a signal path 60 to the diluent source 44 to provide an appropriate aloquot of diluent. The sensor can take a variety of forms, such as, a float attached to a switch or a column of photocells. In a particular embodiment of the invention, the sensor is an ultrasonic detector, which is mounted above the diluted mixture and senses the distance from the diluted mixture to the detector. An example of a suitable ultrasonic detector is marketed by Honeywell Inc., as Model No. 945-F4Y-2D-1CO-180E. In this embodiment the controller has a microprocessor with a memory unit that includes a look-up table to relate the distance measured by the ultrasonic detector to the volume of the mixing tank.

The diluent source 44 can also take a variety of forms, such as, a holding tank and "flush" mechanism (actuable siphon), a tank and a pump, or a valve operated by a solenoid. The controller 58 can be a simple dedicated electronic circuit of discrete circuit elements or can be a function of a digital logic circuit that can report or monitor temperature, diluted mixture usage and the like. A mechanical or hydraulic controller could also be used.

The proportionality of the water or other diluent to the concentrate or concentrates added is a function of the chemistry of the materials used and for many embodiments of the invention, is predetermined by the manufacturer of the concentrates, prior to use of the mixer for a particular diluted mixture. The mixer can include provision to accommodate concentrate containers of different standard sizes, if desired. Necessary sensors and controls for varying the diluent added with a parameter of the concentrate added, for example, concentrate weight, can be incorporated in the mixer. Provision can similarly be made to modify the diluted mixture in response to variations in a particular parameter; for example, pH, if desired for a particular purpose.

The reservoir lid 34 receives the diluent delivered by the diluent outlet 50 in a reservoir 62 that has a volume that is less than the volume of the aloquot of water or other diluent. The reservoir 62 has an overflow reservoir outlet 64 that drains excess diluent into the mixing tank 32 as the diluent is received. The capacity of the overflow reservoir outlet 64, desirably, exceeds the rate of flow of the diluent source 44, so that excess diluent does not overflow the top of the reservoir lid 34. The reservoir lid 34 includes a through-passage or opening 66, through which the concentrate enters the mixing tank 32, bypassing the reservoir 62.

In the embodiment of the invention shown in the Figures, the reservoir lid 34 has a shell 68 having a downwardly directed peripheral margin 70 that engages the upper margin of the mixing tank 32. The through-passage 66 is central and the reservoir 62 has a U-shape that curves around the through-passage 66. The reservoir 62 is disposed in the underside of the shell 68 between the peripheral margin 70 and the through-passage 66. The reservoir 62 has an upwardly directed inlet 72, that preferably includes a strainer-diffuser 74 to help reduce splashing. The overflow reservoir outlet 64 is laterally directed and, in the embodiment shown in the figures, faces the through-passage 66. The reservoir 62 has a downwardly directed weep hole 76. The weep hole 76 has a rate of flow substantially less than the rate of flow of the diluent outlet 50. The floor 82 of the reservoir 64 is sloped toward the weep hole 76. Except for the inlet 72, the overflow reservoir outlet 64, the weep hole 76, and a pump intake hole 77; the reservoir 62 is fully enclosed by the top 80 of the shell 68, a floor 82, a laterally disposed peripheral wall 84, and a spillway wall 86 adjoining the overflow reservoir outlet 64. The shell 68 of the reservoir lid 34 can include cut-outs 87 as necessary to meet the size constraints imposed by other components of the mixer 10.

A pump 88 has an intake 78 that extends, through hole 77, into the reservoir 64 and an exhaust 90 directed into the container receiver 16. In the embodiment of the invention shown in the Figures, passages 92,94 connect the intake 78, the pump 88, and the opener 22. The exhaust 90 consists of ports in a hollow opener 22 which, in effect, acts as a spray head for the pump 88. The pump 88 can be operated continuously (if self priming) or can be actuated by the controller 58 via a signal path 96 to operate at the same time diluent is supplied (or operate slightly thereafter). The pump 88, in that embodiment of the invention, can have a rate of flow less than the rate of flow of the diluent outlet 50 so that the pump 88 will not run dry.

Referring now primarily to FIGS. 1 and 2, a batch of concentrate is added to the container receiver 16 and the station 12 is actuated. The container 14 is opened and drains (arrows 98) into the mixing tank 32 through the central opening 66 in the reservoir lid 34. The original volume of diluted mixture in the mixing tank, indicated by dashed line 100, is increased to a new level, indicated by dashed line 102, tripping the sensor 54. The diluent source 44 is actuated and delivers an aloqout of diluent (arrow I04) proportional to the concentrate added to the mixing tank 32. Replacement diluent (arrow 106) is drawn from the supply system as needed. The diluent (arrow 104) is delivered by the diluent source 44 into the reservoir lid 34 and first fills the reservoir lid 34 to the depth (indicated by dashed line 108 in FIG. 2) determined by the vertical height of the spillway wall 86. Excess diluent (arrow 110) then drains over the spillway wall 86 until delivery of the diluent is completed. In the meantime, the pump 88 draws diluent (arrows 111) from the reservoir 62 and sprays the diluent into the emptied container 14 (arrows 112). The diluent that was sprayed (arrows 98), including any washed down residual concentrate, drains through the central opening into the mixing tank 32. Residual diluent not drawn from the reservoir by the pump drains through the weep hole into the mixing tank 32 (arrow 114) and the reservoir is thus emptied. Concentrate and diluent entering the mixing tank 32 is mixed and the depth of the mixture in the mixing tank reaches a new level, indicated by dashed line 118. The diluted mixture is drawn down as needed (arrow 116 in FIG. 1).

Figure 6A:
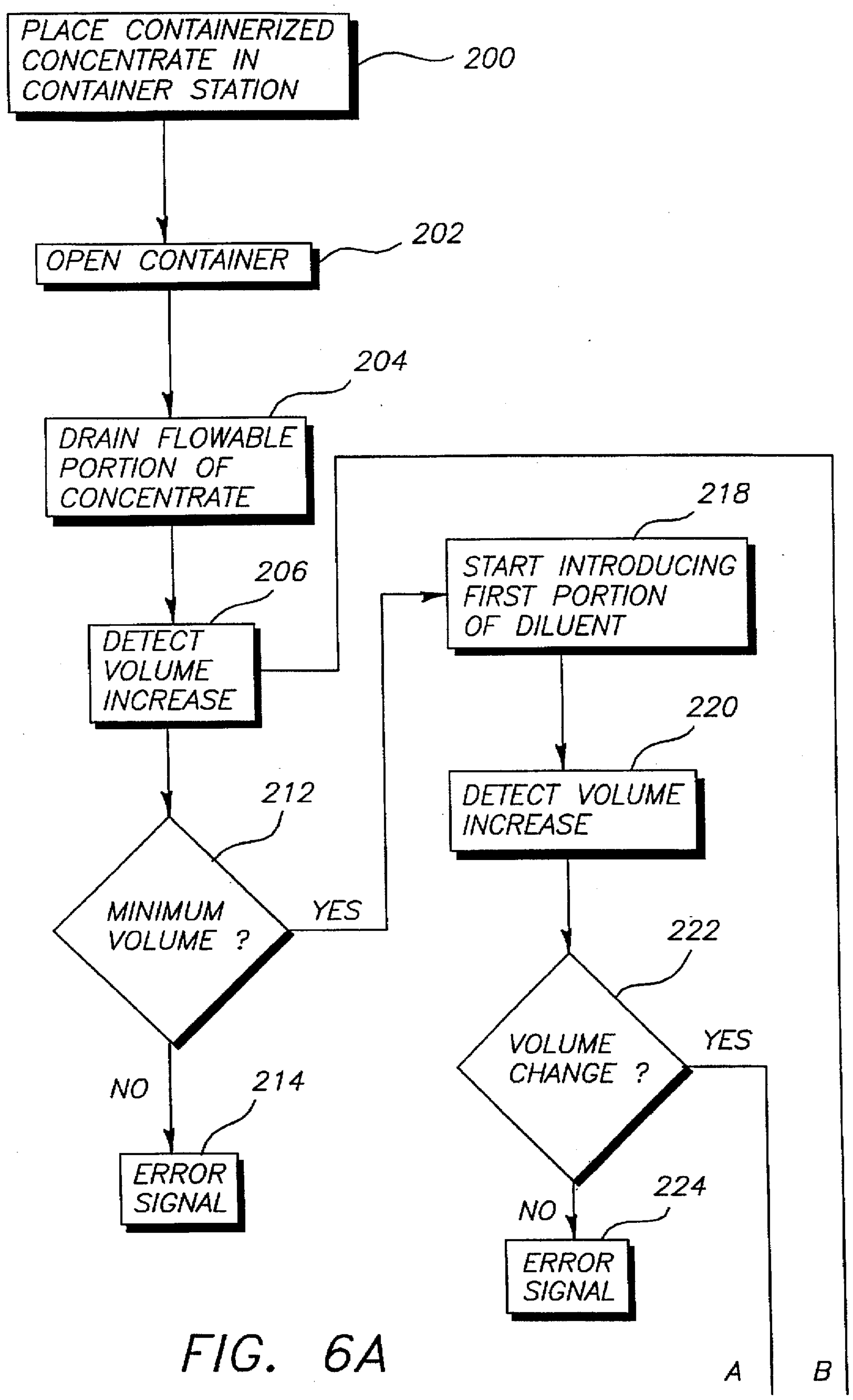
FIG. 6A–6B are a semi-diagrammatical view of a method of using the batch mixer of the invention.
Figure 6B:
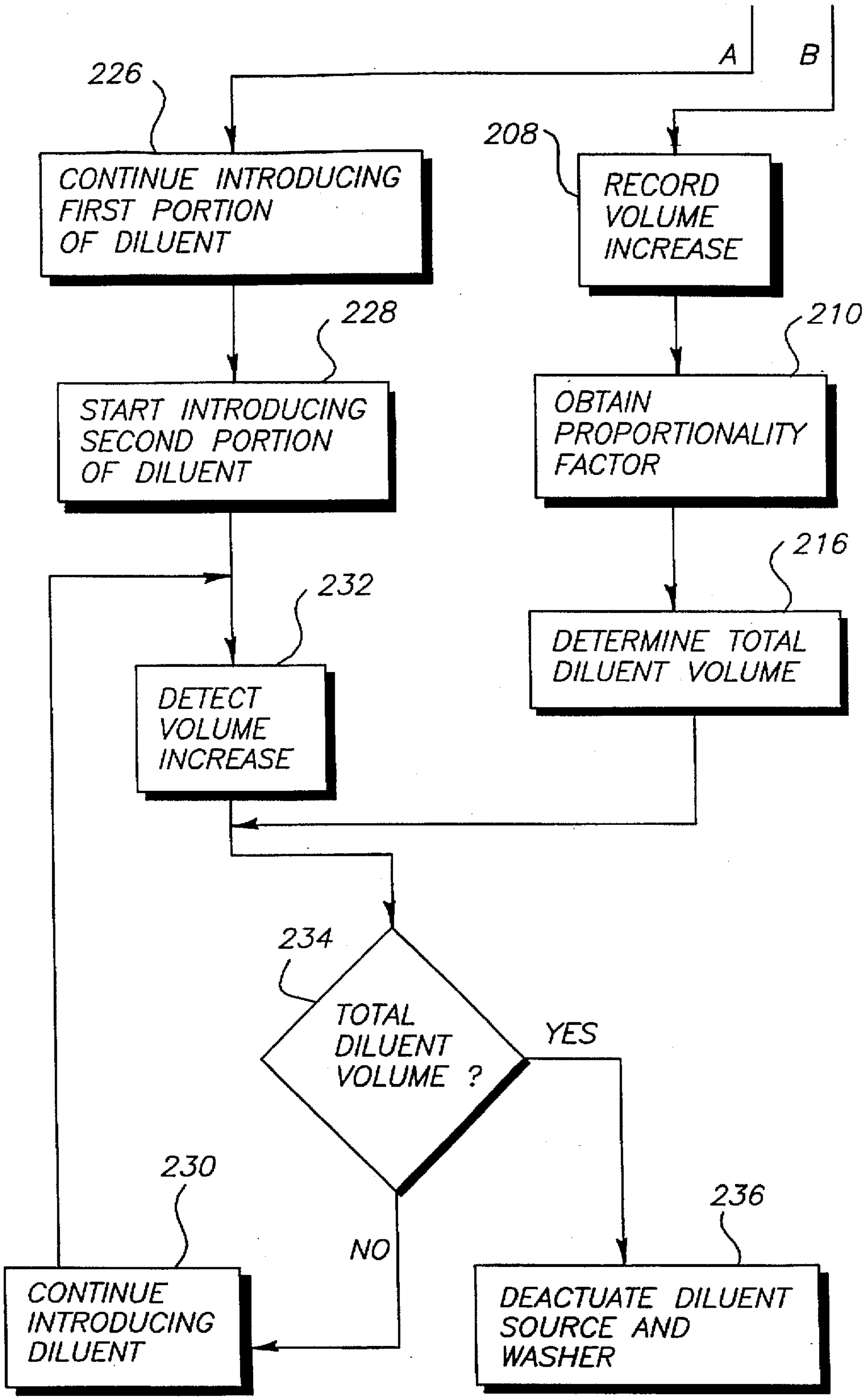

Referring now to FIGS. 1 and 6A–6B, the batch mixer of the invention can also be used in the procedure that follows. A concentrate container 14 is placed (200) in the container station 12 and the container 14 is opened (202) by means of the opener 22. A flowable portion of the concentrate is then drained (204) out of the container 14, through a funnel 20, and into a mixing volume or mixing tank 32 where a mixing mechanism 40, such as a stirrer, provides mixing. The term "flowable" is used herein to refer to that portion of a liquid, within an open container, that can be removed by upending the container and waiting until flow stops. With relatively dilute aqueous solutions, the rate limiting factor for drainage of the flowable portion of a liquid, is generally the the configuration of the container opening. The term "residual" is used herein to refer to that portion of the liquid that does not drain, but rather remains in the container as a thin, and generally discontinuous, layer or pattern on the interior wall of the container.

The sensor 54 detects (206) the volume increase due to the delivery of the flowable portion of concentrate to the mixing volume 32 and sends a signal to the controller 58. Concentrate volume information provided by the signal, or a calculated total diluent volume based upon the concentrate volume information, is recorded (208) by the controller 58. A convenient controller 58 utilizes a microprocessor and stores the volume information in a memory element associated with the microprocessor. The sensor 54 provides a signal compatible with the microprocessor. Suitable sensors are discussed in greater detail below. The functions provided by the controller are not complex. Thus, the controller can be "hard-wired" using discrete electronic components. Memory storage can be provided by an array of flip-flops (bistable multivibrators) or switches or the like.

The controller 58 determines (216) a value of total diluent volume based upon the concentrate volume information and a proportionality factor or proportional value. The value of the proportionality factor can be obtained (210) as needed from current parameters of the diluted mixture. For example, the proportionality factor can be provided by means of a secondary sensor that detects some parameter, such as the specific gravity of the diluted mixure. Suitable parameters and sensors are known to those skilled in the art.

It is currently preferred that the proportionality factor is predetermined and is the dilution ratio necessary to produce a solution of a particular concentration from a concentrate having a standarized concentration and total volume. The controller 58 can be limited to a single predetermined proportionality factor or a series of such factors. If limited to a single factor, the controller can be very simple and can be limited to an on-off or error-no error function. This approach reduces complexity, but inhibits the use of multiple sizes of containers and precludes fine manipulation of the proportionality factor to meet individual requirements. It is preferred that the proportionality factor be provided by software or hardware incorporating a look-up table or calulation that can be manipulated to meet changes in container sizes, or individual variability or the like. Provision can also be made to preclude withdrawls of the diluted mixture, prior to addition of required amounts of both concentrate and diluent.

In a particular embodiment of the invention, when the concentrate is added to the mixing volume 32, the concentrate volume information is also compared (212) to a predetermined minimun value. If the concentrate volume information exceeds the predetermined minimum value, then introduction of the first portion of diluent is started (218). If the concentrate volume information does not exceed the predetermined minimum value, the controller does not respond, but rather waits for more concentrate to be added. An error signal (214) can be generated, if the predetermined minimum value is not exceeded within a particular time. The error signal can be used to halt the operation and notify the operator of the error condition. The predetermined minimum value can represent the minimal flowable volume of the smallest size container usable in the apparatus. Alternatively, the predetermined minimum value could be set to the size of the container in the container station, either manually, or automatically by means of a sensor in the container station.

After the addition of the flowable portion of concentrate is completed or is substantially completed, introduction is started of a first portion of diluent. The diluent is provided by the diluent supply system 48, to the diluent source 44 and the allocation unit 46 of the diluent source 44 provides the aloquot of diluent of appropriate volume. The diluent is provided through a diluent outlet 50 of the diluent source 44. The diluent is directed to the reservoir 62. From the reservoir, a first portion overflows into the mixing tank 32. A second portion is retained by the reservoir 62 until the washing step, discussed below. The first and second portions of diluent have a total volume that is proportional to the total volume of the concentrate. Back-siphoning of diluent into the supply system 48 is deterred by the air gap 52, which is above the mixing tank 32 and thus protected from any possible overflow of the tank 32.

In a particular embodiment of the invention, the sensor 54 detects (220) the volume change in the mixing tank and sends a signal corresponding to an initial diluent volume increase and the controller 58 compares (222) this increase to a minimal initial diluent value, ordinarily zero. If there is no volume change relative to the minimal initial diluent value, an error signal (224) is generated, which can be used to halt the operation and notify the operator of the error condition. If a greater volume is detected, then introduction of the diluent is continued (226).

During or after the start of the introduction (228) of the second portion of diluent, the washer 88 is actuated, resulting in the washing (not separately indicated in FIG. 6A–6B) of the container. The draining (204) of the flowable portion of the concentrate is completed or substantially completed prior to the washing of the container with the second portion of diluent. The second portion of diluent is used to wash the residual portion of the concentrate from the container, resulting in a volume of liquid referred to herein as "wash diluent". The wash diluent is added to the mixing volume.

Diluent continues (230) to be added until the increase in volume is in accord with the total diluent volume. The sensor 54 is used to detect (232) the volume increase which is then compared (234) by the controller to the total diluent volume. This is repeated until the total diluent volume has been reached. The diluent source is the deactuated (236) to complete the process.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

Parts List
mixer 10
station 12
container 14
container receiver 16
concentrate outlet 18
vanes 19 of opener
funnel 20
core 21 of opener
container opener 22
receiver unit 24
Weep holes in receiver unit 26
cap of bottle 28
piston 30
mixing tank 32
reservoir lid 34
tube portion 36
upper margin of the mixing tank 38
mixing mechanism 40
tank outlet 42
diluent source 44
allocation unit 46
connection 48 to a large diluent delivery system
diluent outlet 50
air gap 52
sensor 54
signal path 56
controller 58
signal path 60
reservoir 62
overflow reservoir outlet 64
through-passage 66
shell 68 peripheral margin 70 of reservoir lid
inlet 72
strainer 74
weep hole 76 of reservoir lid
pump intake 78
top 80 of shell
floor 82 of reservoir
peripheral wall 84 or reservoir
spillway wall 86
pump 88
exhaust 90
passages 92,94
signal path 96
arrows identifying flow of materials: 98, 100, 102, 104, 108, 110, 112, 114, 116
depth of reservoir 106
placing step (200)
opening step (202)
draining step (204)
detecting step (206)
recording step (208)
obtaining step (210)
comparing step (212)
error signal step (214)
determining step (216)
starting introduction step (218)
detecting step (220)
comparing step (222)
error signal step (224)
continuing introduction step (226)
start introducing step (228)
continuing introducing step 230
detecting step (232)
comparing step 234
deactuating step 236

What is claimed is:

1. A batch mixer, for mixing a container of concentrate with a diluent, said container having a total volume of concentrate in excess of a predetermined minimimum volume, said batch mixer comprising:

a station for said concentrate container, said station having a container receiver and a concentrate outlet communicating with said container receiver, said station delivering concentrate through said concentrate outlet;

a diluent source being actuable to supply an aloquot of diluent proportional to said total volume of concentrate at a predetermined rate of flow;

a reservoir disposed to receive said aloquot of diluent from said diluent source, said reservoir having a volume less than the volume of said aloquot, said reservoir having an overflow reservoir outlet disposed to drain diluent in excess of said volume of said reservoir;

a mixing tank disposed to receive said diluent from said overflow reservoir outlet and disposed to receive said concentrate from said concentrate outlet; and a pump having an intake disposed in said reservoir and having an exhaust directed into said container receiver.

2. The batch mixer of claim 1 wherein said pump has a rate of flow less than said rate of flow of said diluent source.

3. The batch mixer of claim 2 wherein said overflow reservoir outlet has a rate of flow substantially equal to or greater than said rate of flow of said diluent source.

4. The batch mixer of claim 3 wherein said reservoir has a weep hole disposed to fully drain said reservoir into said mixing tank, said weep hole having a rate of flow substantially less than said rate of flow of said diluent source.

5. The batch mixer of claim 1 wherein said reservoir has a weep hole disposed to fully drain said reservoir into said mixing tank, said weep hole having a rate of flow substantially less than said rate of flow of said diluent source.

6. The batch mixer of claim 1 wherein said overflow reservoir outlet has a rate of flow substantially equal to or greater than said rate of flow of said diluent source.

7. The batch mixer of claim 1 further comprising a controller for actuating said diluent source and said pump.

* * * * *